United States Patent Office 3,287,426
Patented Nov. 22, 1966

3,287,426
FLUORINATION WITH SiF₄
Karl O. Christe and Attila E. Pavlath, Berkeley, Calif., assignors to Stauffer Chemical Company, New York, N.Y., a corporation of Delaware
No Drawing. Filed July 1, 1963, Ser. No. 292,100
2 Claims. (Cl. 260—653.8)

This invention relates to a new process for preparing fluorine-containing organic compounds utilizing silicon tetrafluoride as the fluorinating agent. In particular, it relates to a new process for the replacement of chlorine atoms by fluorine atoms in certain selected chlorine-containing organic compounds. Because of the temperature range of the reaction it is necessary to limit this invention to those organic compounds whose thermal stability will enable them to withstand this high temperature. Specifically, these organic compounds will work: perhalomethanes, chloroform, tetrachloroethylene and hexachloropropene.

The utilization of the fluorine values of silicon tetrafluoride as a fluorinating agent is very useful, since the silicon tetrafluoride is produced as a gaseous by-product in the industrial superphosphate plants. This provides a source for inexpensive silicon tetrafluoride. Previously the utilization of the silicon tetrafluoride required the absorption of the gas in water and thus form fluosilicic acid, which was converted by neutralization with sodium hydroxide solution to sodium fluosilicate. The sodium fluosilicate was then used in certain fluorination reactions at high pressure and high temperature. We propose the use of gaseous silicon tetrafluoride.

The fluorine perhalomethanes, i.e., dichlorodifluoromethane and trichloromonofluoromethane, are extremely valuable compounds. They find extensive use as refrigerant liquids, as dielectric fluids, and as propellants in aerosols.

This invention has as an object a new process for preparing fluorine-containing compounds utilizing the fluorine values of silicon tetrafluoride.

This object is accomplished by the present invention of a process which comprises reacting silicon tetrafluoride with selected chlorine-containing organic compounds, e.g., carbon tetrachloride, chloroform, tetrachloroethylene, hexachloropropene, at a temperature within the range 400° C. to about 900° C. and isolating the fluorine-containing compounds formed.

The respective proportions of the chlorine-containing organic compound and silicon tetrafluoride are not critical. However, it is desirable to use the two reactants in such ratio that there is present in the reaction tube at least one gram atom of fluorine for each gram atom of chlorine present in the organic compound. The proportion of fluorine has been increased, i.e., amount of silicon tetrafluoride, in certain reactions where the advantage as a carrier gas was to be utilized. In the cases where the chlorine-containing organic compound is a liquid excess silicon tetrafluoride was used as a carrier gas to carry the material into the heated reaction zone. The organic compound was placed in a flask adjacent to the reactor tube and warmed to a sufficient temperature which would give a satisfactory vapor pressure and likewise the desirable ratio of reactants. Our preferred ratio is two gram atoms of fluorine per gram atom of chlorine.

The reactants are passed through a heated tubular reactor, the material of construction of which is not important; metal, quartz, or equivalent reaction tubes may be used. Although not essential for reaction, but desirable for proper heat transport and better yields, the use of a packing was employed in the reactor. The nature of the packing similarly is not important. We found the use of a quartz tube with high surface quartz granules produced satisfactory results when used at moderate temperature ranges.

The temperatures at which the fluorination reactions can be carried out rely heavily on the reactivity of the exchangeable chlorines and the thermal stability of the chlorinated organic compound. Actually, reaction will occur at any temperature, however, to be economically feasible the higher temperatures are favored. It is therefore not practical to operate below about 300° C. in this invention. To obtain practical conversions to the desired products, it is preferred to work within the approximate range of 400° C. to 900° C.

Since the reaction is carried out in a heated tubular reactor at atmospheric pressure, this invention has a distinct advantage of being easily adaptable to a continuous flow system. The retention time is not critical. Satisfactory results are obtained with retention times of 5 to 60 seconds. Our preferred range is from 5 to 20 seconds.

More specifically, if we consider the fluorination of carbon tetrachloride carried out with silicon tetrafluoride according to the present invention, we will see the effect of temperature on the product. This reaction results in a mixture of mono-, di- and trifluorochloromethanes in quantitative yields and conversions of 60 to 80% per pass. The composition of the reaction products can be changed easily by variation of the reaction temperature. At lower temperature a higher yield of monofluorotrichloromethane is observed. Whereas, at higher temperature a higher yield of difluorodichloro- and trifluoromonochloromethane are obtained.

If we use a trihalomethane, as chloroform, we find the effect of temperature on the thermal stability of the compound quite dominate. The upper limit for this type of compound is 650° C. where an undesirable amount of decomposition and disproportionation takes place. This effect will be demonstrated in Example III involving chloroform. Therefore, the desirable range for this compound is 450–600° C.

Fluorination of activated CCl₃-groups, for example in hexachloropropene, can be carried out easily due to the activation of the allylic chlorines. Whereas, in trying to replace the vinylic chlorines of tetrachloroethylene we find a greater resistance to exchange.

The following examples illustrate the present invention.

*Example 1.*—A gas mixture consisting of silicon tetrafluoride and carbon tetrachloride in a ratio of 2:1 was passed through an electrically heated quartz tube at 600° C. The quartz tube was filled with surface active quartz granules. A retention time of 10 seconds was achieved by regulating the silicon tetrafluoride gas flow through the carbon tetrachloride container.

The above example is Example 1 of Table I below, which includes the results of a similar reaction carried out at 800° C., all other conditions being equal. The results are of the gaseous reaction products, after removal of excess silicon tetrafluoride and unreacted carbon tetrachloride. The effect of temperature can clearly be seen in the preparation of chlorofluoromethanes by the present invention.

TABLE I.—PREPARATION OF CHLOROFLUOROMETHANES FROM CARBON TETRACHLORIDE AND SILICON TETRAFLUORIDE

| Example | Temperature, °C. | Percent Conversion of CCl₄ | Percent Yield of | | |
|---|---|---|---|---|---|
| | | | CF₃Cl | CF₂Cl₂ | CFCl₃ |
| 1 | 600 | 57.8 | | 18.9 | 81.1 |
| 2 | 800 | 77.1 | 17.2 | 51.3 | 31.5 |

*Example 3.*—A gaseous mixture of chloroform and silicon tetrafluoride in the ratio of 1:5 was passed through a quartz tube at 450° C. The tube was packed with high surface quartz granules. The retention time was 10 seconds. Analysis of the obtained organic product showed it contained on a molar basis, 1.5% monofluorodichloromethane and 96.8% chloroform. This represented a starting material conversion of 3.2% and a yield of 47% of the monofluoro compound.

The above example is Example 3 of Table II below, which gives examples of several other temperatures used in the reaction of chloroform and silicon tetrafluoride. All other conditions were kept constant except for the reaction zone temperature. The composition of the reaction products was figured after removal of excess silicon tetrafluoride.

TABLE II.—PREPARATION OF $CHFCl_2$ FROM $CHCl_3$ AND $SiF_4$

| Example | Temperature, ° C. | Mol Percent Composition of Products | Percent Conversion of $CHCl_3$ | Percent Yield of $CHFCl_2$ |
|---|---|---|---|---|
| 3 | 450 | 1.5 $CHFCl_2$<br>1.7 Unidentified<br>96.8 $CHCl_3$ | 3.2 | 47.0 |
| 4 | 500 | 1.5 $CHFCl_2$<br>2.7 Unidentified<br>95.8 $CHCl_3$ | 4.25 | 34.7 |
| 5 | 550 | 2.2 $CHFCl_2$<br>4.9 Unidentified<br>92.9 $CHCl_3$ | 7.1 | 31.1 |

*Example 6.*—In the same manner as Example 1, a gas mixture of perchloroethylene and silicon tetrafluoride in the ratio of 2:5 was passed through a packed quartz tube heated to 800° C. The retention time was 6 seconds. The analysis of the reaction products gave the following results: 2.4% monofluorotrichloroethylene, 0.4% carbon tetrachloride, 0.08% chlorine and the remainder was starting materials. The recovered starting material mixture could be recycled.

*Example 7.*—A gas mixture of hexachloropropene and silicon tetrafluoride in the ratio 1:7 was passed through an electrically heated quartz tube which was filled with surface active quartz granules. The reaction temperature was 520° C. The retention time was 10 seconds. The analysis of the reaction products gave a conversion to fluorinated products of 87%. The main product of the resulting compounds was $CF_2Cl$—$CCl$=$CCl_2$ in a yield of 56.8%.

Various changes and modifications may be made in the process described herein as will be apparent to those skilled in the chemical arts. It is accordingly intended that the present invention shall only be limited by the scope of the appended claims.

We claim:
1. A process for the preparation of halogenated organic compounds in which at least one halogen atom is fluorine and any other halogen is chlorine, which comprises bringing a chlorinated organic compound starting material, selected from the group consisting of perhalomethanes, chloroform, tetrachloroethylene and hexachloropropene, in contact at a temperature of at least 300° C. with silicon tetrafluoride, and isolating said fluorine-containing organic compound formed by this substitution reaction.

2. A process for the preparation of fluorochloromethanes comprising bringing carbon tetrachloride and silicon tetrafluoride in contact at a temperature of at least 300° C.

References Cited by the Examiner

UNITED STATES PATENTS 2,757,214 7/1956 Muetterties _____ 260—544 X
2,935,531 5/1960 Dahmlos _____ 260—544

FOREIGN PATENTS 623,358 7/1961 Canada.

OTHER REFERENCES

Bennett: "Chemical and Technical Dictionary," p. 792 (1962).

Mellor: "Comprehensive Treatise on Inorganic and Theoretical Chemistry," vol. 6 (1925), pp. 936–937.

LORRAINE A. WEINBERGER, *Primary Examiner.*

R. K. JACKSON, *Examiner.*